United States Patent
Hearnden et al.

(10) Patent No.: US 9,106,478 B2
(45) Date of Patent: Aug. 11, 2015

(54) SYSTEM, METHOD AND COMPUTER PROGRAM PRODUCT FOR SCANNING PORTIONS OF DATA

(71) Applicant: McAfee, Inc., Santa Clara, CA (US)

(72) Inventors: Stephen Owen Hearnden, Milton Keynes (GB); Martin J. Lucas, Aylesbury (GB); Christopher M. Hinton, Andover (GB); Nicolas K. Wilson, Wendover (GB)

(73) Assignee: MCAFEE, INC., Santa Clara, CA (US)

( * ) Notice: Subject to any disclaimer, the term of this patent is extended or adjusted under 35 U.S.C. 154(b) by 52 days.

(21) Appl. No.: 13/629,679

(22) Filed: Sep. 28, 2012

(65) Prior Publication Data
US 2013/0042320 A1    Feb. 14, 2013

Related U.S. Application Data

(63) Continuation of application No. 11/612,969, filed on Dec. 19, 2006, now Pat. No. 8,307,428.

(51) Int. Cl.
*H04L 29/06* (2006.01)
(52) U.S. Cl.
CPC .... *H04L 29/06918* (2013.01); *H04L 29/06911* (2013.01); *H04L 63/14* (2013.01); *H04L 63/1416* (2013.01)
USPC ............... 726/22; 726/23; 726/24; 726/25; 713/188
(58) Field of Classification Search
CPC .................. H04L 29/06918; H04L 29/06911; H04L 63/14; H04L 63/1416
USPC ................. 726/22, 23, 24, 25; 713/188, 200; 718/188
See application file for complete search history.

(56) References Cited

U.S. PATENT DOCUMENTS

| | | | |
|---|---|---|---|
| 5,987,610 A | 11/1999 | Franczek et al. | |
| 6,021,510 A | 2/2000 | Nachenberg | |
| 6,073,142 A | 6/2000 | Geiger et al. | |
| 6,088,803 A * | 7/2000 | Tso et al. ........................ 726/22 |
| 6,460,050 B1 | 10/2002 | Pace et al. | |
| 6,735,700 B1 | 5/2004 | Flint et al. | |
| 6,931,540 B1 | 8/2005 | Edwards et al. | |
| 6,973,578 B1 | 12/2005 | McIchionc | |
| 7,058,975 B2 | 6/2006 | Edwards et al. | |
| 7,069,594 B1 | 6/2006 | Bolin | |
| 7,243,373 B2 | 7/2007 | Muttik et al. | |
| 7,506,155 B1 | 3/2009 | Stewart et al. | |
| 8,214,898 B2 | 7/2012 | Liu | |
| 8,307,428 B1 | 11/2012 | Hearnden et al. | |
| 8,544,096 B2 | 9/2013 | Van Brabant | |
| 2002/0138766 A1 | 9/2002 | Franczek et al. | |
| 2002/0174137 A1 | 11/2002 | Wolff et al. | |
| 2003/0023864 A1 | 1/2003 | Muttik et al. | |
| 2003/0051154 A1 | 3/2003 | Barton et al. | |
| 2003/0196103 A1 | 10/2003 | Edwards et al. | |
| 2005/0021994 A1 * | 1/2005 | Barton et al. ................. 713/200 |
| 2005/0149749 A1 | 7/2005 | Van Brabant | |
| 2007/0245031 A1 | 10/2007 | Liu | |

* cited by examiner

*Primary Examiner* — William Goodchild
*Assistant Examiner* — Thong Truong
(74) *Attorney, Agent, or Firm* — Patent Capital Group

(57) ABSTRACT

A scanning system, method and computer program product are provided. In use, portions of data are scanned. Further, access to a scanned portion of the data is allowed during scanning of another portion of the data.

15 Claims, 7 Drawing Sheets

SYSTEM, METHOD AND COMPUTER PROGRAM PRODUCT FOR SCANNING PORTIONS OF DATA

RELATED APPLICATION

This patent application is a continuation (and claims the benefit of priority under 35 U.S.C. §120) of U.S. application Ser. No. 11/612,969, filed Dec. 19, 2006, entitled, "SYSTEM, METHOD AND COMPUTER PROGRAM PRODUCT FOR SCANNING PORTIONS OF DATA." The disclosure of the prior application is considered part of (and is incorporated by reference in) the disclosure of this application.

FIELD OF THE INVENTION

The present invention relates to data processing, and more particularly to scanning data.

BACKGROUND

Increasingly, computer systems have needed to protect themselves against unwanted computer code. Such unwanted computer code has generally taken the form of viruses, worms, Trojan horses, spyware, adware, and so forth. To combat the dissemination of unwanted computer code, systems (e.g. intrusion detection systems, virus scanners, etc.) have been created for scanning data (e.g. files, etc.) to identify whether such data incorporates unwanted computer code. However, such systems often prevent access to data during scanning until the data is finished being scanned, thus causing an extended delay in satisfying a request made with respect to the data.

There is thus a need for overcoming these and/or other issues associated with the prior art.

SUMMARY

A scanning system, method and computer program product are provided. In use, portions of data are scanned. Further, access to a scanned portion of the data is allowed during scanning of another portion of the data.

DETAILED DESCRIPTION

Figure 1:
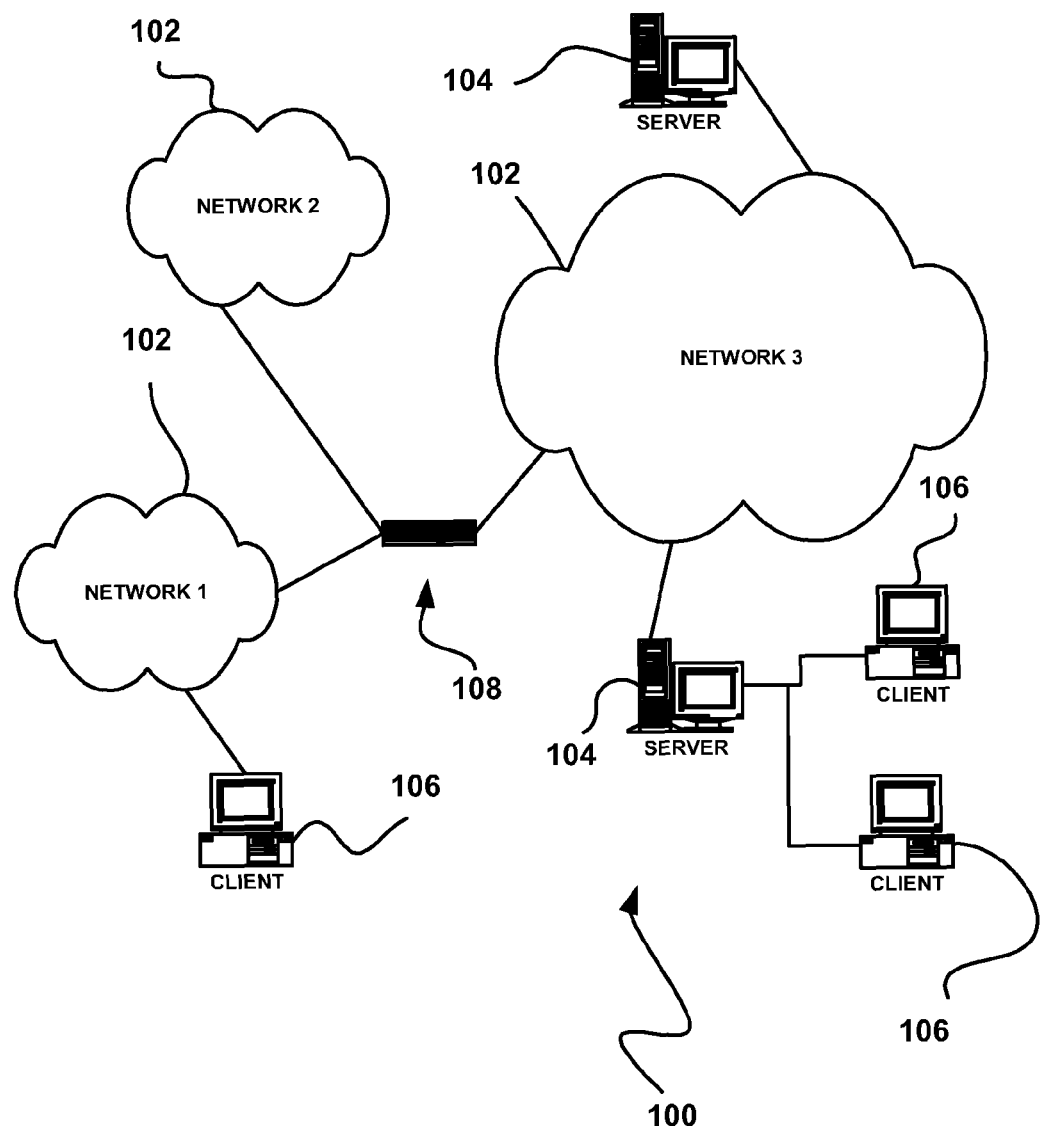
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer/device, and/or any other type of logic, for that mater. In order to facilitate communication among the networks 102, at least one gateway 108 is optionally coupled therebetween.

Figure 2:
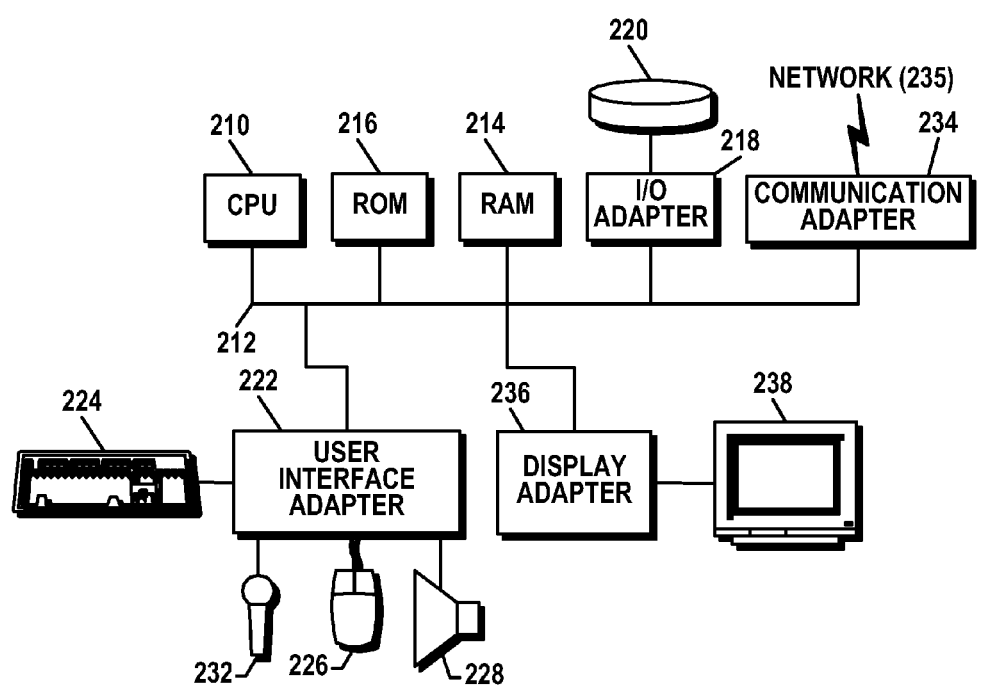
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit (CPU) 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
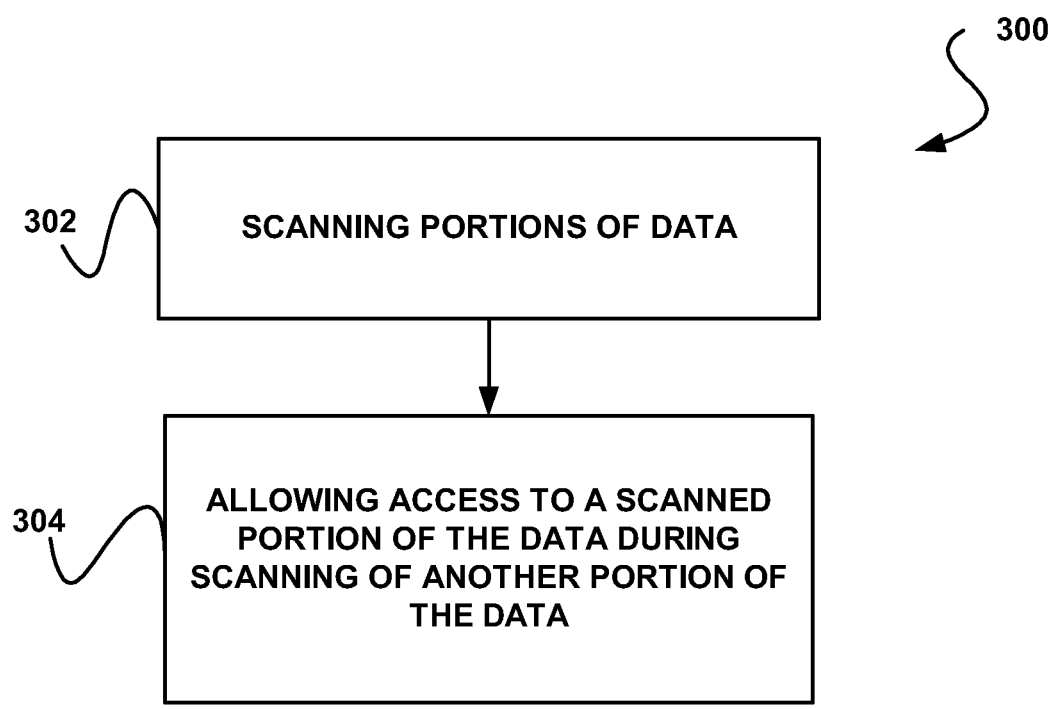
FIG. 3 shows a method for scanning portions of data, in accordance with one embodiment.

FIG. 3 shows a method 300 for scanning portions of data, in accordance with one embodiment. As an option, the method 300 may be implemented in the context of the architecture and environment of FIGS. 1 and/or 2. Of course, however, the method 300 may be carried out in any desired environment.

As shown in operation 302, portions of data are scanned. The data may include, for example, a file (e.g. Microsoft® Office document, Zip file, a database file, etc.), computer code (e.g. application, etc.), etc. Of course, in the context of the present description, the data may also include any type of computer code and/or any other data capable of being scanned.

In the context of the present description, the portions of the data may include any parts of the data. In various embodiments, the portions of the data may include a plurality of different types of data portions. Just by way of example, the portions of the data may include a page of the data (e.g. a page in an electronic document, etc.), formatting information associated with the data (e.g. font, spacing, etc.), content information associated with the data (e.g. structure of the data, index of information within the data, etc.), macros within the data, etc.

In one optional embodiment, the portions of the data may include an associated known or unknown clean status. For example, an unknown clean status may indicate that an associated portion of the data has changed since a previous scan thereof (where such previous scan identified the portion of the data as clean). As an option, the aforementioned status may be used to queue requested data portions for scanning Different embodiments that employ status information in a similar manner will be described in more detail later with respect to FIGS. 6-7.

Moreover, in other possible embodiments, the portions of the data may optionally be scanned based on a predetermined order. For example, a first portion of the data may be scanned prior to a second portion of the data. One possible predefined order associated with a different embodiment will be described in more detail later with respect to FIG. 5. Of course, in other embodiments, the portions of the data may be scanned at least partially in parallel and/or in any other desired manner.

In use, the portions of the data may be scanned utilizing any desired system and/or application capable of scanning data. In one embodiment, the portions of the data may be scanned utilizing an anti-virus scanner. Accordingly, the portions of the data may be scanned for unwanted data (e.g. malware, etc.), for example. In other various embodiments, the portions of the data may be scanned on-demand, on-access, automatically, etc. Further, other embodiment are contemplated where the scanning is performed for intrusion detection purposes, spyware/adware identification, general content scanning, and/or any other type of scanning, for that matter.

Still yet, access to a scanned portion of the data is allowed during scanning of another portion of the data, as shown in operation 304. In the context of the present description, the scanned portion of the data may include any portion of the data for which scanning has completed. In one optional embodiment, the scanned portion of the data may optionally include a portion of the data which is identified as clean (e.g. uninfected with unwanted data, etc.) based on the scanning.

Additionally in the context of the present description, allowing access to the scanned portion of the data may include at least partially allowing any type of access to the scanned data portion. In various optional embodiments, such request may be initiated by a request from an application, a user, etc. Also, in one embodiment, the request may include a file system request. Of course, any type of access is contemplated.

In one exemplary embodiment, allowing access may optionally include allowing a read operation to be performed on the scanned portion of the data. In another example, allowing access may include allowing a write operation to be performed on the scanned portion of the data. In still yet another example, allowing access may include allowing a seek operation to be performed on the scanned portion of the data.

Furthermore, the aforementioned other portion of data being scanned may include any portion of the data for which scanning has not completed. For example, in one embodiment, the other portion of the data may be in the process of being scanned, such that the other portion of the data is partially scanned. In another exemplary embodiment, the other portion of the data may be pending scanning (e.g. in a queue waiting to be scanned, etc.), such that scanning for such portion of the data has not yet commenced.

Thus, access to one portion of the data that has been scanned may be allowed while another portion of the data is being scanned. In this way, limiting access to data until all portions of the data are scanned may optionally be avoided, in some embodiments. Moreover, a delay in accessing the data may be at least partially limited by allowing access to portions of the data as such portions of the data are scanned.

More illustrative information will now be set forth regarding various optional architectures and features of different embodiments with which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
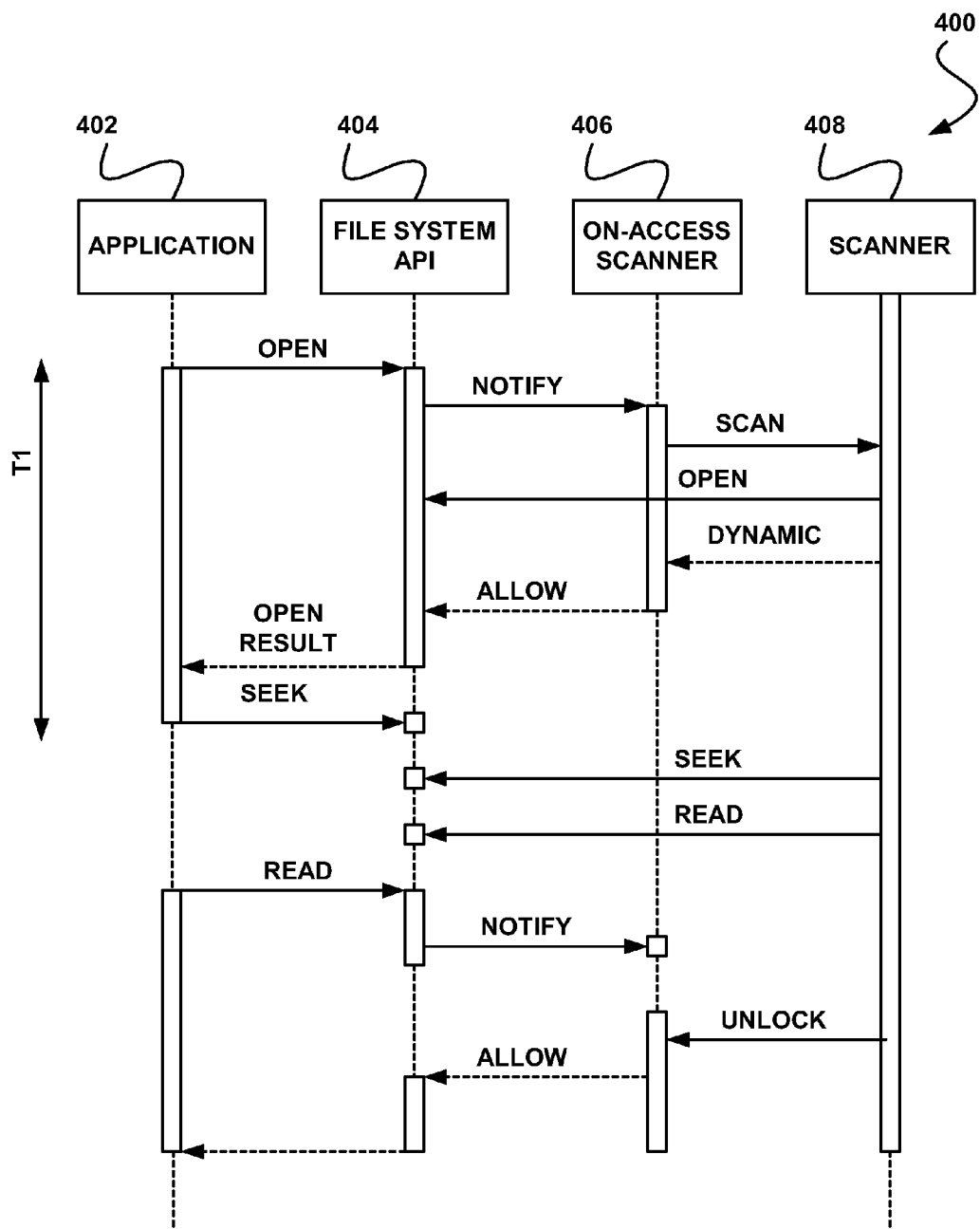
FIG. 4 shows a system for scanning portions of data, in accordance with another embodiment.

FIG. 4 shows a system 400 for scanning portions of data, in accordance with another embodiment. As an option, the system 400 may be implemented in the context of the architecture and environment of FIGS. 1-3. Of course, however, the system 400 may be carried out in any desired environment. It should also be noted that the aforementioned definitions may apply during the present description.

As shown, an application 402 issues an open request to a file system application programming interface (API) 404. The application 402 may include any computer code (e.g. software, etc.) capable of issuing a request. For example, such open request may include a request to open data. Of course, while an open request is shown, it should be noted that any request to access data may be issued by the application 402 (e.g. read data, write to data, seek data, etc.). Optionally, the data may include a file.

Also, the file system API 404 may include any interface capable of receiving an open request from the application 402. In one embodiment, the file system API 404 may intercept requests issued to a file system. The file system may include any system capable of storing and/or providing data in response to a request for the data. For example, the file system API 404 may intercept all requests made to a file system by applications, users, etc.

In addition, the file system API 404 notifies an on-access scanner 406 of the open request. The on-access scanner 406 may include any scanner capable of receiving notification of a request to open or otherwise access data. In one embodiment, the on-access scanner 406 may include a scanner 408 for scanning data (e.g. anti-virus scanner, etc.). In another embodiment, the on-access scanner 406 may include an interface that is separate from the scanner 408, but which is in communication with such scanner 408.

Further, the notification may include information associated with the open request. For example, the notification may include a unique identifier that identifies the data which was requested to be opened. In one embodiment, the unique identifier may include an inode number, which identifies an inode of the data (e.g. a data structure that stores information about the data with which it is associated, etc.).

As another example, the notification may include a location of the data which was requested to be opened. In still yet another example, the notification may indicate the application 402 that requested to open the data. Moreover, the notification may optionally indicate the type of request made with respect to the data (e.g. open, read, write, seek, etc.).

Moreover, the on-access scanner 406 may determine whether the data requested to be opened is to be scanned. In one embodiment, the on-access scanner 406 may identify a status of each of a plurality of portions of the data. The status may include a known clean status, an unknown clean status, etc. While identifying a status of each portion of the data is described herein, it should be noted that, in another embodiment, a status of the data as a whole may also similarly be identified.

For example, the status may be identified based on a comparison of a particular portion of the data and a previously scanned version of such portion of the data. Thus, the status may be utilized for determining whether the portion of the data has even previously been scanned and/or whether the portion of the data has changed since a previous scan of the portion of the data. In one embodiment, a previously scanned version of the portion of the data may be stored (e.g. in a cache, etc.), such that the previously scanned version may be accessed for being compared to a current version of the portion of the data. In another embodiment, a checksum of the previously scanned version of the portion of the data may be stored for utilization in a comparison with a checksum of the current version of such portion of the data.

Accordingly, the known clean status may indicate that the portion of the data has not changed since being previously scanned. Still yet, the unknown clean status may indicate that the portion of the data has changed since the data was previously scanned or that the data has not been previously scanned. If the status of the portion of the data includes an unknown clean status, the on-access scanner 406 may issue a scan request to the scanner 408. Thus, for each portion of data, it may be determined whether such portion is to be scanned based on a status thereof. Of course, however, in other embodiments, the on-access scanner 406 may also automatically issue the scan request to the scanner 408 without regard to a status of the portion of the data.

If a portion of the data is associated with a known clean status, the portion of the data is allowed to be opened by the application 402 without scanning such portion (not shown). In another embodiment, the scanner 408 scans each portion of data associated with an unknown clean status. Different embodiments that employ status information in a similar manner will be described in more detail later with respect to FIGS. 6-7.

The scanner 408 may also optionally scan each portion of the data in a predetermined order. More information regarding a different embodiment employing a predetermined scanning order will be described in more detail with respect to FIG. 5.

Based on the scanning, the scanner 408 determines whether each portion of data is clean. As shown, if it is determined that a first portion of the data is clean (e.g. where the first portion of the data is determined to be clean during and/or before scanning another portion of the data, etc.), the scanner 408 issues an open function call to the file system API 404. Thus, the scanner 408 allows access to the data via the file system API 404.

To this end, the scanner 408 dynamically issues a return to the on-access scanner 406 indicating that such portion of the data is clean. Specifically, the scanner 408 may issue an unlock message to the on-access scanner 406 for indicating that the on-access scanner 406 is to allow the application 402 to open the clean portion of the data. As shown, the scanner 408 may issue the return to the on-access scanner 406 while scanning additional portions of the data.

In response to receipt of the unlock message, the on-access scanner 406 issues an allow message to the file system API 404, such that the file system API 404 may provide the open result to the application 402 for fulfilling the open request. In this way, access to scanned portions of data may be allowed by the application 402 while the scanner 408 scans other portions of the data. Accordingly, the application 402 and the scanner 408 may process different portions of the data in parallel, therefore decreasing latency (as shown in time T1) in allowing access to the data by the application 402.

As further shown, the application 402 may also issue a seek request and/or read request, which may be processed as described above with respect to the open request.

As also shown, the scanner 408 may continuously scan portions of the data associated with all requests made by the application 402 during additional requests made thereby. The scanner 408 may unlock portions of the data upon completion of the scanning thereof and/or upon a determination that such portions are clean. Thus, the scanner 408 may continuously allow access to portions of data by the application 402 prior to the scanning of all of portions of the data being completed.

Figure 5:
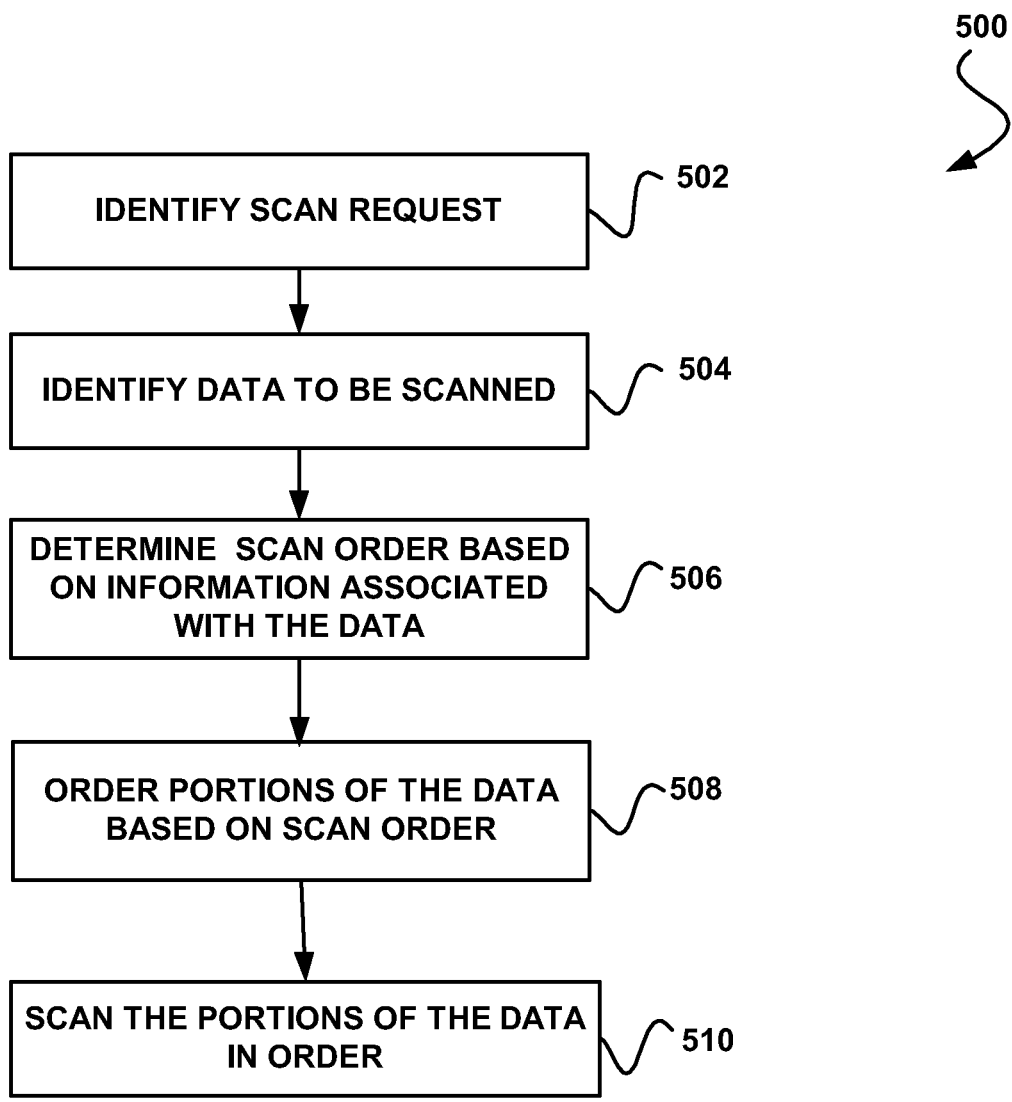
FIG. 5 shows a method for ordering portions of data and scanning the portions of data based on the order, in accordance with yet another embodiment.

FIG. 5 shows a method 500 for ordering portions of data and scanning the portions of data based on the order, in accordance with yet another embodiment. As an option, the method 500 may be implemented in the context of the architecture and environment of FIGS. 1-4. Of course, however, the method 500 may be carried out in any desired environment. It should also be noted that the aforementioned definitions may apply during the present description.

As shown in operation 502, a scan request is identified. The scan request may be identified based on a request to access data. Thus, in one embodiment, the scan request may include an on-access scan request, whereby the request to scan data is issued upon a request to access the data.

In addition, data to be scanned is identified, as shown in operation 504. The data may be identified utilizing the scan request. For example, the scan request may indicate the data to be scanned. In one exemplary embodiment, the data may include a file requested to be accessed.

Further, as shown in operation 506, a scan order is determined based on information associated with the data. The scan order may indicate an order in which to scan various portions of the data. Moreover, the information associated with the data on which the scan order is based may include a file type of the data, an application requesting to access the data, an access mode, a context of the access (e.g. a reason why the data is requested to be accessed, etc.), and/or any other information capable of being associated with the data.

In one embodiment, the scan order may include a predetermined order. Just by way of example, the predetermined order may be based on a pattern in which an application accesses the portions of the data. In particular, the predetermined order may be based on an order in which an application requesting to access the data may access the portions of the data. Thus, the scan order may allow portions of the data to be scanned in the order in which they may be accessed by an application requesting to access the data.

In one embodiment, a database of predetermined orders may be utilized for determining the scan order. Table 1 illustrates an exemplary database of predetermined scan orders. It should be noted that such database is set forth for illustrative purposes only, and therefore should not be construed as limiting in any manner.

TABLE 1

| Application | File Type | Example Scanning order |
|---|---|---|
| Zip application | Office document | Scan the document from beginning to end to allow for sequential storage within a zip file |
| Office application | Office document | Scan the formatting information and the first page to allow this to be displayed. Then scan the rest of the document in order. |

TABLE 1-continued

| Application | File Type | Example Scanning order |
|---|---|---|
| Zip application | Zip file | Scan the manifest data which describes the content of the zip file. Then scan the documents within the zip file. |

Still yet, the portions of the data are ordered based on the determined scan order, as shown in operation 508. In one embodiment, the portions of the data may be ordered by storing the portions of the data in a queue according to such scan order. Of course, however, the portions of the data may be ordered based on the determined scan order in any desired manner.

Moreover, as shown in operation 510, the portions of the data are scanned in order. Thus, once a first portion of the data in the order is scanned, a second portion of the data in the order may be scanned, and so forth. More information with respect to scanning the portions of the data in order will be described with respect to the description of FIG. 7 below.

Accordingly, portions of data associated with a scan request may be ordered for facilitating an ordered scanning thereof. In addition, the order may allow portions of the data required to be accessed first by a requesting application to be provided to the application first. In this way, it may be ensured that the requesting application may actually be capable of utilizing the portions of the data as they are made accessible thereto.

Just by way of example, if an application requests a file, portions of the file may be scanned in an order based on an access pattern utilized by the application to access the contents of the file. Thus, if the application requires metadata that describes the structure of the file to be accessed first in order to utilize the remaining portions of the file, the metadata may be scanned first. Accordingly, it is ensured that the application does not have to wait for a complete scan of the entire file and/or a scan of unscanned portions of the file before accessing the scanned portions of the data.

Figure 6:
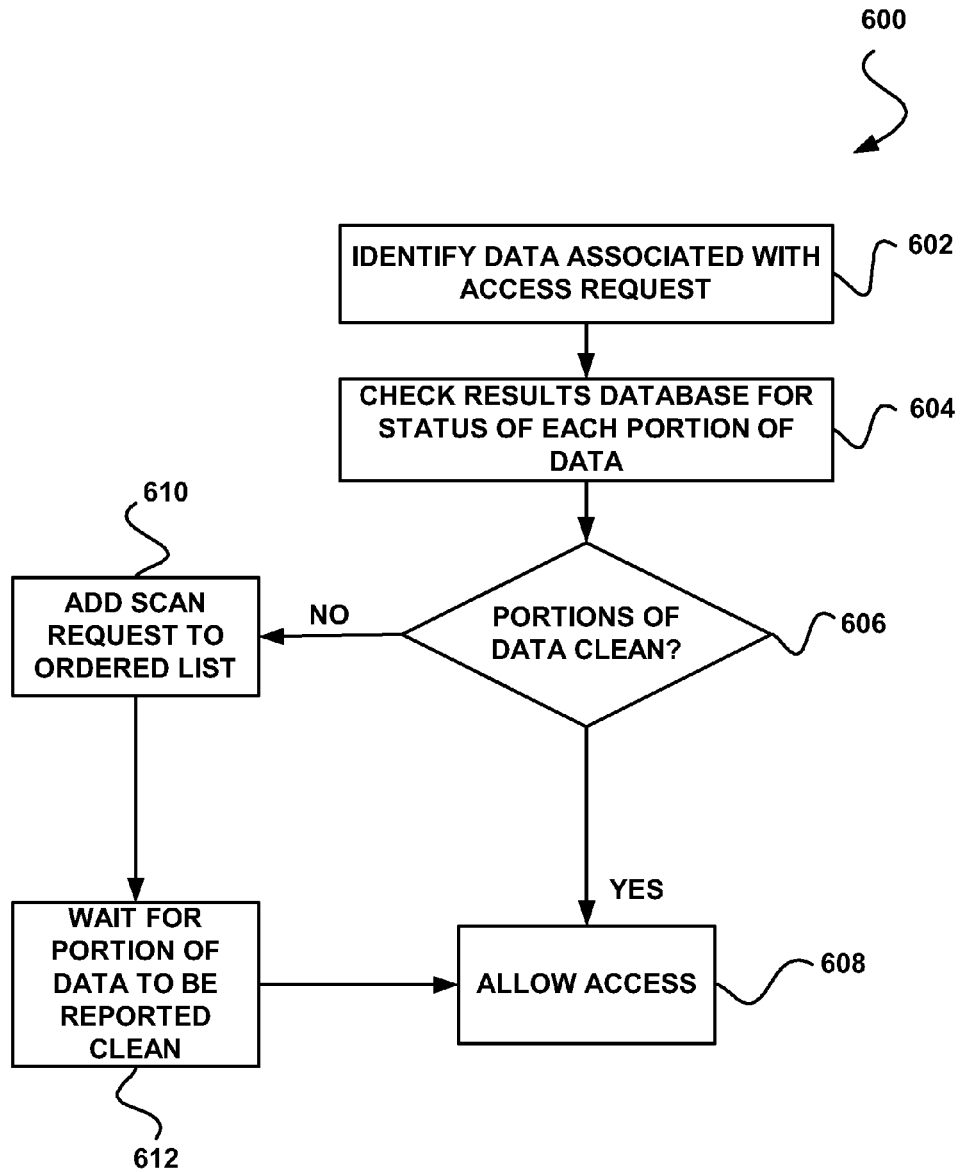
FIG. 6 shows a method for allowing access to portions of data, in accordance with still yet another embodiment.

FIG. 6 shows a method 600 for allowing access to portions of data, in accordance with still yet another embodiment. As an option, the method 600 may be implemented in the context of the architecture and environment of FIGS. 1-5. Of course, however, the method 600 may be carried out in any desired environment. It should also be noted that the aforementioned definitions may apply during the present description.

Optionally, the operations described with respect to the present method 600 may be performed by an on-access scanner, such as for example, the on-access scanner described above with respect to FIG. 4. As shown in operation 602, data associated with an access request is identified. The access request may be issued by an application, for example. In addition, in one embodiment, the data may include data requested to be accessed by the access request.

Further, a results database is checked for identifying a status of each of a plurality of portions of the data, as shown in operation 604. In one embodiment, the results database may store scan results of previously scanned portions of the data. In another embodiment, the results database may store a previously scanned version of each of the portions of the data.

Thus, the results database may be checked for determining whether any portions of the data associated with the access request has changed since a previous scan of such portions of the data, where such previous scan identified the portions as clean. If the results database indicates that a portion of the data has not changed, the status of such portion may include a known clean status. If, however, the results database indicates that the portion of the data has changed or that the portion has not been previously scanned, the status of the portion may include an unknown clean status.

Accordingly, it may be determined whether the portions of the data are clean, as shown in decision 606. For example, if a portion of the data is associated with a known clean status, the portion may be determined to be clean. Further, if a portion of the data is determined to be clean, access is allowed, as shown in operation 608. Thus, the access request may be at least partially satisfied by allowing access to portions of the data that are determined to be clean.

If a portion of the data is not determined to be clean in decision 606, a scan request is added to an ordered list of scan requests, as shown in operation 610. The scan request may include any request to scan such portion of the data. For example, the scan request may indicate the portion of the data to be scanned. In addition, the list of scan requests may be ordered based on a priority of such scan requests. For example, the list of scan requests may include a priority queue of scan requests.

In one embodiment, the priority may be based on an order in which the scan requests are made. In another embodiment, the priority may be based on an access pattern associated with such portions. For example, the scan requests may be ordered according to an order in which an entity (e.g. application, etc.) that issued the access request may access such portions of the data.

As an option, the ordered list of scan requests may be utilized by a scanner for scanning the portions of the data associated with such scan requests. More information regarding scanning the data according to the ordered list of scan requests will be described in more detail with respect to FIG. 7. The present technique then waits for results of the scanning of data portions that require scanning, as shown in operation 612. For example, the portions of the data may be reported as clean based on a scan of such portions. Once a portion of the data is reported as clean, access to such portion is allowed, as shown in operation 608.

Optionally, if the portion of the data is reported as unclean, an action may be taken in response thereto (not shown). Such action may include, for example, blocking access to the portion of the data, logging the unclean status of the portion of the data, notifying the entity requesting to access the data of the unclean status of the portion of the data, etc. Thus, known clean portions of data associated with an access request may be automatically allowed to be accessed, whereas unknown clean portions of data associated with an access request may be conditionally allowed to be accessed based on scanning thereof. Further, such unknown clean portions of the data may be scanned such that as each portion is scanned and determined to be clean, access thereto is allowed, regardless of whether scanning additional portions of the data is in process and/or pending.

Figure 7:
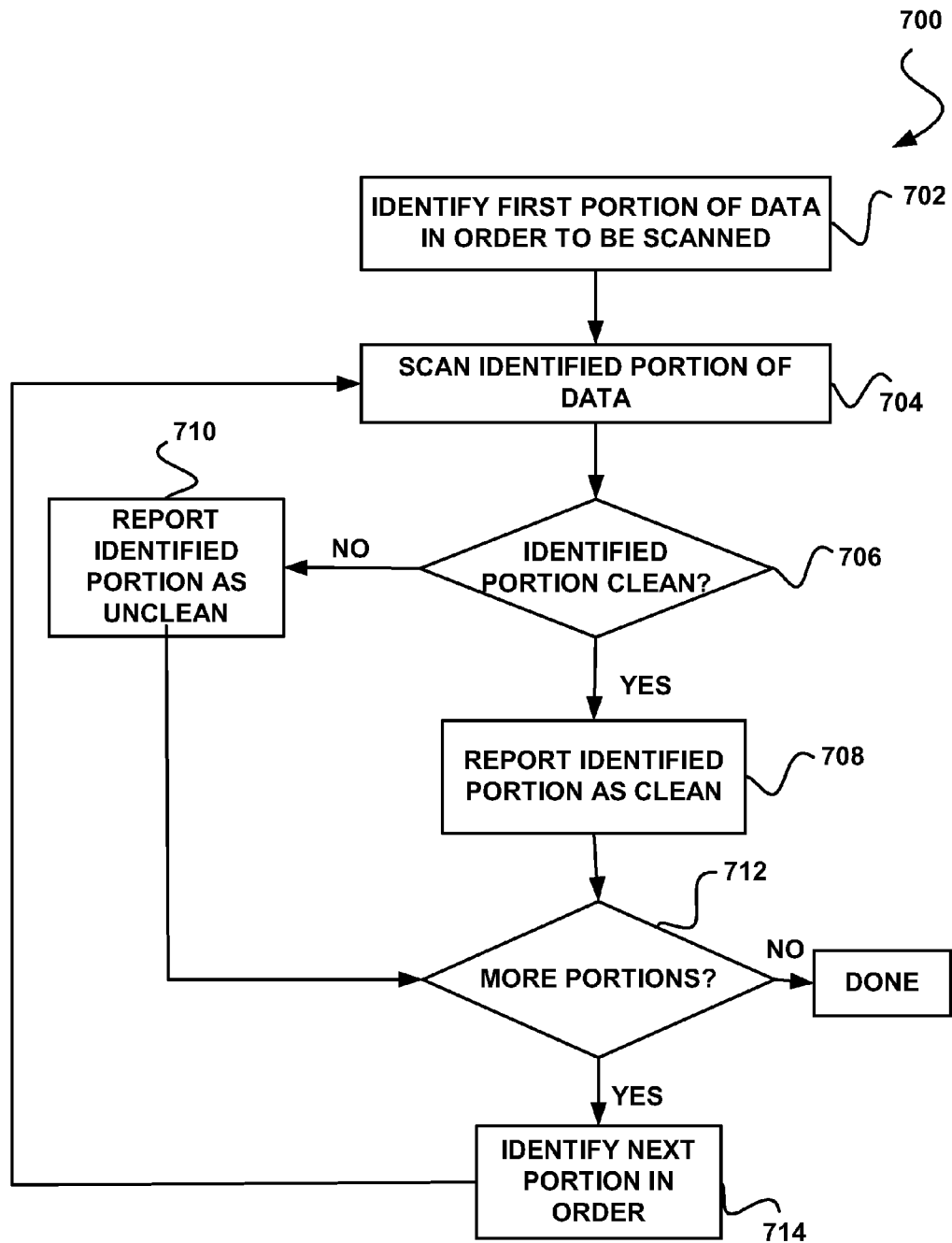
FIG. 7 shows a method for scanning ordered portions of data, in accordance with another embodiment.

FIG. 7 shows a method 700 for scanning ordered portions of data, in accordance with another embodiment. As an option, the method 700 may be implemented in the context of the architecture and environment of FIGS. 1-6. Of course, however, the method 700 may be carried out in any desired environment. It should also be noted that the aforementioned definitions may apply during the present description.

Optionally, the operations described with respect to the present method 700 may be performed utilizing a scanner, such as for example, the scanner described above with respect to FIG. 4. As shown in operation 702, a first portion of data in an order to be scanned is identified. The first portion of the data may be identified utilizing an ordered list of scan requests, such as that described above with respect to FIG. 6 (see operation 610). Thus, the first portion of the data may be identified via a first scan request in an order of scan requests.

In addition, the identified portion of the data is scanned, as shown in operation 704. Just by way of example, the identified portion of the data may be scanned utilizing malware signatures, heuristics, etc. Thus, the identified portion of the data may be scanned for unwanted data.

Accordingly, it is determined whether the identified portion of the data is clean, as shown in decision 706. If the identified portion of the data is determined to be clean, such portion is reported as clean (note operation 708). If, however, the identified portion of the data is determined to be unclean, such portion is reported as unclean (note operation 710).

In one embodiment, the report may be issued to an on-access scanner that requested the portion of data be scanned. In another embodiment, the report may be issued to an interface (e.g. the file system API described above with respect to FIG. 4, etc.) which is capable of allowing and/or blocking access to the data by the entity that requested such access. Of course, however, the report may be issued to any desired component.

It is also determined whether there are more portions of data in the order to be scanned, as shown in decision 612. If there are more portions, a next portion of the data to be scanned is identified, as in operation 614. Such next portion of the data is then scanned, in the manner described above. Accordingly, a plurality of portions of data to be scanned may be scanned according to an order associated therewith.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer implemented method, comprising:
    receiving a notification from a file system application programming interface, by an on-access scanner, of a request by an application to access data;
    determining a status of each one of a plurality of portions of the data;
    providing scan requests for two or more portions of the data when the two or more portions are determined to have unknown clean statuses;
    prioritizing the scan requests to be performed based, at least in part, on a particular order utilized by the application to access the data, wherein a first scan request for a first portion of the data is prioritized to be performed before a second scan request for a second portion of the data when the application requires the first portion of the data to be accessed prior to the second portion of the data; and
    sending, by the on-access scanner, an allow message to the file system programming interface when a scan of the first portion of the data indicates the first portion has a known clean status, the allow message indicating that the file system application programming interface is to allow access to the first portion of the data, wherein the first portion of the data is accessed by the application during scanning of one or more other portions of the data.

2. The method of claim 1, wherein at least one of the unknown clean statuses of the two or more portions of the data indicates at least one portion of the data has not been previously scanned.

3. The method of claim 1, wherein at least one of the unknown clean statuses of the two or more portions of the data indicates at least one portion of the data has changed based on a comparison of the at least one portion and a previously scanned version of the at least one portion.

4. The method of claim 3, further comprising:
    comparing a checksum of the at least one portion of the data to a checksum of the previously scanned version of the at least one portion to determine whether the at least one portion has changed.

5. The method of claim 1, further comprising:
    allowing access to the second portion of the data if a scan result indicates the second portion does not contain unwanted code.

6. The method of claim 1, wherein the request to access data is intercepted by the file system application programming interface.

7. At least one non-transitory computer readable medium comprising computer code that when executed by a processor:
    receives a notification from a file system application programming interface, by an on-access scanner, of a request by an application to access data;
    determines a status of each one of a plurality of portions of the data;
    provides scan requests for two or more portions of the data when the two or more portions are determined to have unknown clean statuses;
    prioritizes the scan requests to be performed based, at least in part, on a particular order utilized by the application to access the data, wherein a first scan request for a first portion of the data is prioritized to be performed before a second scan request for a second portion of the data when the application requires the first portion of the data to be accessed prior to the second portion of the data; and
    sending, by the on-access scanner, an allow message to the file system programming interface when a scan of the first portion of the data indicates the first portion has a known clean status, the allow message indicating that the file system application programming interface is to allow access to the first portion of the data, wherein the first portion of the data is accessed by the application during scanning of one or more other portions of the data.

8. The at least one computer readable medium of claim 7, wherein at least one of the unknown clean statuses of the two or more portions of the data indicates at least one portion of the data has not been previously scanned.

9. The at least one computer readable medium of claim 7, wherein at least one of the unknown clean statuses of the two or more portions of the data indicates at least one portion of the data has changed based on a comparison of the at least one portion and a previously scanned version of the at least one portion.

10. The at least one computer readable medium of claim 7, wherein the request to access data is intercepted by the file system application programming interface.

11. A system, comprising:
    a processor configured to:
        receive a notification from a file system application programming interface, by an on-access scanner, of a request by an application to access data;
        determine a status of each one of a plurality of portions of the data;
        provide scan requests for two or more portions of the data when the two or more portions are determined to have unknown clean statuses;

prioritize the scan requests to be performed based, at least in part, on a particular order utilized by the application to access the data, wherein a first scan request for a first portion of the data is prioritized to be performed before a second scan request for a second portion of the data when the application requires the first portion of the data to be accessed prior to the second portion of the data; and sending, by the on-access scanner, an allow message to the file system programming interface when a scan of the first portion of the data indicates the first portion has a known clean status, the allow message indicating that the file system application programming interface is to allow access to the first portion of the data, wherein the first portion of the data is accessed by the application during scanning of one or more other portions of the data.

12. The system of claim 11, wherein at least one of the unknown clean statuses of the two or more portions of the data indicates at least one portion of the data has not been previously scanned.

13. The system of claim 11, wherein at least one of the unknown clean statuses of the two or more portions of the data indicates at least one portion of the data has changed based on a comparison of the at least one portion and a previously scanned version of the at least one portion.

14. The system of claim 11, the processor further configured to:

allow access to the second portion of the data if a scan result indicates the second portion does not contain unwanted code.

15. The system of claim 11, wherein the request to access data is intercepted by the file system application programming interface.

* * * * *